(12) United States Patent
Vasudevan et al.

(10) Patent No.: US 7,430,241 B2
(45) Date of Patent: Sep. 30, 2008

(54) METHOD FOR EARLY DECODING OF CONTROL CHANNEL INFORMATION

(75) Inventors: Subramanian Vasudevan, Morristown, NJ (US); Yunsong Yang, Piscataway, NJ (US); Wenfeng Zhang, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 900 days.

(21) Appl. No.: 10/388,553

(22) Filed: Mar. 14, 2003

(65) Prior Publication Data

US 2004/0179586 A1    Sep. 16, 2004

(51) Int. Cl.
*H04L 27/00* (2006.01)

(52) U.S. Cl. ................. 375/259; 370/208; 375/146; 375/340; 380/268; 342/378

(58) Field of Classification Search .......... 370/208, 370/342, 494; 375/134, 146, 340; 380/268, 380/270; 714/755, 788; 342/378
See application file for complete search history.

(56) References Cited

U.S. PATENT DOCUMENTS

| | | | | |
|---|---|---|---|---|
| 3,988,538 A | * | 10/1976 | Patten ..................... | 380/268 |
| 4,901,319 A | * | 2/1990 | Ross ........................ | 714/788 |
| 5,287,384 A | * | 2/1994 | Avery et al. ............. | 375/134 |
| 5,909,434 A | | 6/1999 | Zehavi et al. | |
| 6,069,899 A | * | 5/2000 | Foley ....................... | 370/494 |
| 6,215,762 B1 | * | 4/2001 | Dent ........................ | 370/208 |
| 6,289,486 B1 | * | 9/2001 | Lee et al. ................. | 714/788 |
| 6,304,991 B1 | * | 10/2001 | Rowitch et al. ......... | 714/755 |
| 2001/0036234 A1 | * | 11/2001 | Lundby ................... | 375/340 |
| 2002/0036588 A1 | * | 3/2002 | Gronemeyer ........... | 342/378 |
| 2002/0094038 A1 | * | 7/2002 | Okamura ................. | 375/340 |
| 2002/0097780 A1 | | 7/2002 | Odenwalder et al. | |

OTHER PUBLICATIONS

Mochizuki, et al., "A High Performance Frequency and Timing Synchronization Technique for OFDM," IEEE Global Telecommunications Conference, New York, NY: vol. 6 pp. 3443-3448. Globecom 1998.

* cited by examiner

*Primary Examiner*—David C. Payne
*Assistant Examiner*—Adolf Dsouza (57) ABSTRACT

A system and method for transmitting and receiving control information over a control channel of a wireless communication system where the conveyed information is coded and then transformed by a set of transform function selected from a plurality of sets of transform functions. The control information is transmitted as replicated sub-frames containing replicated code words and such a string of transformed replicated code words is referred to as a control message. At a receive end inverse transform functions from different sets of functions are applied to a sub-frame of a control message so that if the sub-frame is successfully decoded the inverse transform function applied to such frame allows the timing of the control message to be determined.

21 Claims, 3 Drawing Sheets

METHOD FOR EARLY DECODING OF CONTROL CHANNEL INFORMATION

BACKGROUND OF THE INVENTION

1. Field of the Invention

The present invention is related to the transmission and reception of control information in wireless communication systems.

2. Description of the Related Art

Wireless communication systems convey (i.e., transmit and/or receive) information over communication channels whose characteristics vary with time. When communication channels have relatively good characteristics more information can be conveyed over a defined time period. As the characteristics of the communication channels worsen, less information can be conveyed over a defined time period. The information conveyed over the communication channels are adversely affected by various types of noises such as amplitude fading, frequency translation, phase jitter and interference from nearby transmission of the same or other communication systems. Channel coding is often applied to the information prior to transmission so that the information is less vulnerable to noise. Channel coding essentially adds redundancy to the information so that if a portion of the information is adversely affected, another portion can still be decoded at the receiving end. Some well known examples of channel coding are convolutional coding and block coding.

Wireless communication systems that support relatively high speed information services are typically designed with control information that are transmitted over feedback or signaling channels. The feedback channels contain control information (also called control/feedback information) transmitted by the receiver describing the current state of the communication channel over which the received information propagated. It is desirable to transmit information during times when channel conditions are relatively good. The control/feedback information from the receiver informs the transmitter when such good channel conditions exist and provides other system related information, such as timing information about the transmitted information. It is desirable for the receiver to receive information about the timing of the transmitted information because the receiver typically uses such timing information to schedule the transmission and/or reception of corresponding information over a traffic channel; the traffic channel is the communication channel over which information from users of the communication system are conveyed. Fast and reliable control information gives knowledge of the fast changing wireless channel and allows relatively good channel conditions to be exploited. Further, fast acknowledgement by the receiver enables the transmitter to quickly retransmit the information or transmit new information. It is therefore desirable to receive control information that is reliable and robust to noise as such feedback information is transmitted over channels having the same or similar time varying conditions.

In order to make the control information robust to noise, it is typically transmitted as a relatively short burst at relatively high power. The relatively short burst carries much information and is typically subjected to extra channel coding which translates to a signal that uses a relatively large amount of bandwidth. The overhead in power and bandwidth is typically addressed with a design compromise in which a lower information rate is used thus introducing latency in the reception of the control information, i.e., the information is spread out in time. One approach to resolving the high power and relatively large bandwidth requirements of the control information is to design a receiver that can extract information before the block of received information is completely decoded; this is called early decoding and is achieved by utilizing the likelihood metric for the decoding trellis tree. The decoding trellis is a data structure where each element represents a distinct block of information. For each block in the trellis the likelihood (i.e., the probability) that the received block of information is that particular block is calculated and the block having the highest probability is selected as the block that was received. However this technique suffers from three main disadvantages: (1) it applies only to convolutional coded information (2) it is still has relatively low reliability and cannot be used for error detection and (3) it works well only when the receiver knows the timing of the received information, i.e., the beginning of transmission of the information and how long has the transmission occurred; in most cases transmitting such timing information explicitly in-band increases the demand on bandwidth. What is therefore needed is a technique for transmitting signaling information over a feedback channel where the signaling information is reliable regardless of the type of coding used and such signaling information contains data about the timing of transmitted information.

SUMMARY OF THE INVENTION

The present invention provides a system and method for transmitting and receiving information where a set of transform functions may be applied to the information prior to transmission and a set of associated inverse transform functions may be applied to the information upon reception so that early decoding and the determination of the timing of the received information can be performed based on the set of inverse transform functions applied to the received information.

At a transmit end, the method of the present invention first applies channel coding to the information resulting in coded information referred to as a code word. A set of transform functions may be selected from a plurality of sets. The code word may be then replicated a certain number of times equaling the number of transform functions in the selected set. The number of replications is called the repetition factor which is thus determined by the transmitter. Once the transmitter selects the repetition factor it has in effect selected which set of transform functions may be applied to the replicated code words. Each transform function from the selected set is different from any other transform function in the selected set or any other set. A different transform function may be applied to each replicated code word and such transform functions may be applied consecutively to the replicated code words; that is, the first transform function from the selected set may be applied to the first replicated code word, the second transform function may be applied to the second replicated code word and so on yielding a string of transformed replicated code words. The functions of all the sets meet certain criteria defining the relationships between transform functions in the same set or different sets and relationships between transform functions and inverse transform functions. The transformed replicated code words may be transmitted consecutively over a communication channel. The length of time for transmitting each code word may be the same and is referred to as a sub-frame. The repetition factor therefore may be equal to the number of sub-frames in the string of transformed replicated code words; the string of sub-frames containing replicated code words is referred to as a control message. Thus a transformed control message may be transmitted.

At a receive end, the method of the present invention applies associated inverse transform functions from each of the sets of inverse transform functions to a received sub-frame resulting in an inverse transformed sub-frame or a processed sub-frame. System parameters such as the length of each sub-frame and the boundaries between the sub-frames may be known and/or can be detected by the receiving equipment. The received sub-frame may be part of a control message having a particular timing. The timing of the control message, which may be the length of the control message and the starting time of the control message, may be not known by the receiving equipment. However the receiving equipment does know all of the sets of the transform functions that may be used by the transmitter and the order in which any set of transform functions may be applied to the code words of the sub-frames. At the occurrence of each boundary between sub-frames, the method of the present invention applies an inverse transform function from all the sets of inverse transform functions to the sub-frame last received resulting in a processed sub-frame. A sum of the processed sub-frame from all of the sets may be performed (i.e., a soft combination of the sub-frames) and a decoding operation may be performed on each sum. The set whose sum yields a successful decode operation may be used to determine the timing of the control message. The timing of the control message can be determined from knowing the set because the length of the control message may be equal to the number of inverse transform functions in the set and the last applied inverse transform function indicates which of the sub-frames from the control message was last received. Early decoding of the received control message may be possible because the decoding can be successful for any of the sub-frames. Thus, there may be no need to process all of the sub-frames of a control message before successfully decoding the received control message.

The system of the present invention comprises transmit equipment and/or receive equipment. The transmit equipment comprises a transform processor. The transform processor comprises at least one transmitter processing unit that performs operations and/or functions in accordance with a plurality of sets of transform functions. The sets of transform functions may be generated by the transform processor or by other processors that have access to the transmit equipment. The at least one processing unit may be able to process information by selecting, based on an algorithm, a set of transform functions and replicating the information a certain number of times equal to the number of functions in the selected set and then applying the selected set of transform functions to the replicated portions of information.

The receive equipment comprises an inverse processor that performs operations and/or functions in accordance with a plurality of sets of inverse transform functions. The sets of inverse transform functions may be generated by the inverse transform processor or by other processing units having access to the receive equipment. The inverse transform processor comprises at least one receiver processing unit that performs the operations and/or functions in accordance with a plurality of sets of inverse transform functions. The at least one processing unit may be configured to apply inverse transform functions from the different sets to a sub-frame of the received control message resulting in a processed sub-frame. The at least one inverse processing unit then sums the processed portions for each of the sets and attempts to decode the sums. The timing of the received information can be determined by the at least one inverse processing unit based on the set of inverse transform functions from which a sum yielding a successful decode operation was obtained.

DETAILED DESCRIPTION

The present invention provides a system and method for transmitting and receiving information where a set of transform functions may be applied to the information prior to transmission and a set of associated inverse transform functions may be applied to the information upon reception so that early decoding and the determination of the timing of the received information can be performed based on the set of inverse transform functions applied to the received information.

At a transmit end, the method of the present invention first applies channel coding to the information resulting in coded information referred to as a code word. A set of transform functions may be selected from a plurality of sets. The code word may be then replicated a certain number of times equaling the number of transform functions in the selected set. The number of replications is called the repetition factor which may be thus determined by the transmitter. Once the transmitter selects the repetition factor it has in effect selected which set of transform functions may be applied to the replicated code words. Each transform function from the selected set may be different from any other transform function in the selected set or any other set. A different transform function may be applied to each replicated code word and such transform functions may be applied consecutively to the replicated code words; that is, the first transform function from the selected set may be applied to the first replicated code word, the second transform function may be applied to the second replicated code word and so on yielding a string of transformed replicated code words. The functions of all the sets meet certain criteria defining the relationships between transform functions in the same set or different sets and relationships between transform functions and inverse transform functions. The transformed replicated code words may be transmitted consecutively over a communication channel. The length of time for transmitting each code word may be the same and is referred to as a sub-frame. The repetition factor therefore may be equal to the number of sub-frames in the string of transformed replicated code words; the string of sub-frames containing replicated code words is referred to as a control message. Thus a transformed control message may be transmitted.

At a receive end, the method of the present invention applies associated inverse transform functions from each of the sets of inverse transform functions to a received sub-frame resulting in an inverse transformed sub-frame or a processed sub-frame. System parameters such as the length of each sub-frame and the boundaries between the sub-frames may be known and/or can be detected by the receiving equipment. The received sub-frame may be part of a control message having a particular timing. The timing of the control message, which may be the length of the control message and the starting time of the control message, may be not known by the receiving equipment. However the receiving equipment does know all of the sets of the transform functions that may be used by the transmitter and the order in which any set of transform functions may be applied to the code words of the sub-frames. At the occurrence of each boundary between sub-frames, the method of the present invention applies an inverse transform function from all the sets of inverse transform functions to the sub-frame last received resulting in a processed sub-frame. A sum of the processed sub-frame from all of the sets may be performed (i.e., a soft combination of the sub-frames) and a decoding operation may be performed on each sum. The set whose sum yields a successful decode operation may be used to determine the timing of the control message. The timing of the control message can be determined from knowing the set because the length of the control message may be equal to the number of inverse transform functions in the set and the last applied inverse transform function indicates which of the sub-frames from the control message was last received. Early decoding of the received control message may be possible because the decoding can be successful for any of the sub-frames. Thus, there may be no need to process all of the sub-frames of a control message before successfully decoding the received control message.

The system of the present invention comprises transmit equipment and/or receive equipment. The transmit equipment comprises a transform processor. The transform processor comprises at least one transmitter processing unit that performs operations and/or functions in accordance with a plurality of sets of transform functions. The sets of transform functions may be generated by the transform processor or by other processors that have access to the transmit equipment. The at least one processing unit may be able to process information by selecting, based on an algorithm, a set of transform functions and replicating the information a certain number of times equal to the number of functions in the selected set and then applying the selected set of transform functions to the replicated portions of information.

The receive equipment comprises an inverse processor that performs operations and/or functions in accordance with a plurality of sets of inverse transform functions. The sets of inverse transform functions may be generated by the inverse transform processor or by other processing units having access to the receive equipment. The inverse transform processor comprises at least one receiver processing unit that performs the operations and/or functions in accordance with a plurality of sets of inverse transform functions. The at least one processing unit may be configured to apply inverse transform functions from the different sets to a sub-frame of the received control message resulting in a processed sub-frame. The at least one inverse processing unit then sums the processed portions for each of the sets and attempts to decode the sums. The timing of the received information can be determined by the at least one inverse processing unit based on the set of inverse transform functions from which a sum yielding a successful decode operation was obtained.

The method of the present invention will described in the context of control information being transmitted over a control channel of a wireless communication system to provide information about a communication channel through which information has been conveyed. The control channel is typically a communication channel used by the communication system to operate, control and otherwise maintain the proper transmission and reception of information over traffic channels. In many wireless communication systems the boundaries between sub-frames may be detectable by a receiver. The method and system of the present invention describe a receiver that can detect the boundaries between sub-frames. It should be noted that the system and method of the present invention may be applicable to systems (e.g., wireless communication systems, wireline communication systems) in which replicated blocks of information may be transmitted over a medium where a different transform function from a set of transform functions may be applied to each replicated block in consecutive fashion yielding a string of transformed replicated blocks. The length of transmission for each block may be the same and is system defined; the receivers in such systems have the ability to detect boundaries between blocks.

Figure 1:
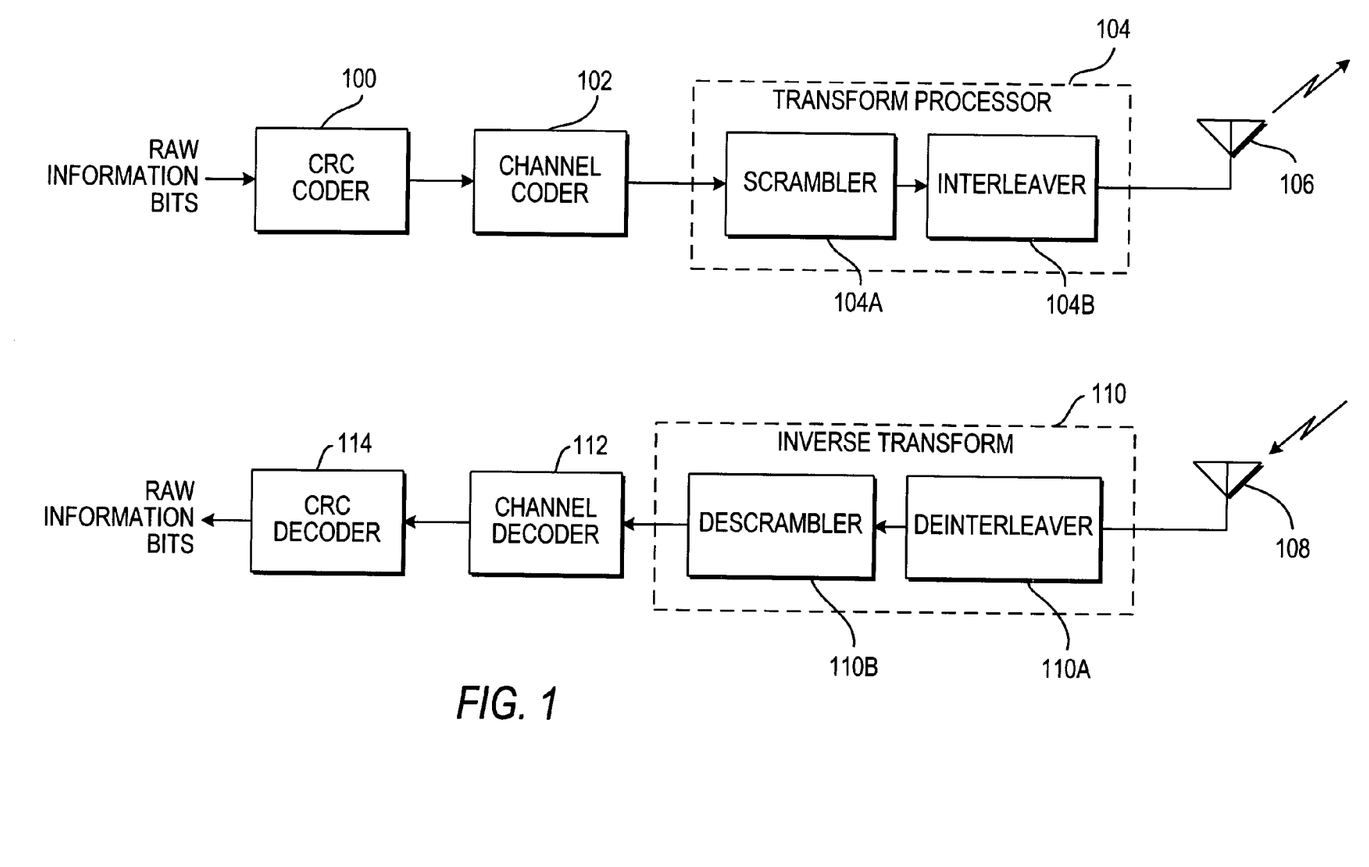
FIG. 1 shows a block diagram of transmission equipment and receiving equipment that transmit and receive information in accordance with the system of the present invention.

Referring to FIG. 1 there is shown the system of the present invention in which transmit equipment applies a set of transform functions to a control message, i.e., a string of replicated coded blocks of information. FIG. 1 also shows receive equipment in which associated inverse transform functions may be applied to a received signal so that if the received signal may be a transformed control message, the application of the correct inverse transform function to a transformed sub-frame allows the sub-frame to be decoded and further allows timing information about the control message to be determined.

The transmit equipment comprises Cyclic Redundancy Check (CRC) coder 100 coupled to channel coder 102 which in turn may be coupled to transform processor 104. The output of transform processor 104 may be applied to various radio equipment (not shown) and may be transmitted via antenna 106. CRC coder 100 is a well known process that is able to add information to the original block of information (i.e., raw information bits) so that the integrity of the information at the receive end can be checked. The output of CRC coder 100 may be a block of information with CRC information added thereto. Thus the CRC coded block of information may be applied to channel coder 102 which adds redundancy to the information. The channel coding performed is typically convolutional coding or block coding. For the convolutional coding, a conventional interleaving operation is usually appended right to the channel coder output. In the present invention, this conventional interleaving operation, if any, may be considered as a part of channel coder 102. Other well known coding techniques can also be used. The output of channel coder 102, which is called code word, may be applied to transform processor 104.

Transform processor 104 also called a transmitter processing unit comprises scrambler 104A and interleaver 104B (the proposed interleaver here is different from the conventional interleaver working with the channel coder). The combination of scrambler 104A and interleaver 104B performs a transform on each replica of the coded block of information. Under certain circumstance, the order of scrambler 104A and interleaver 104B can be changed. The particular transform functions generated by transform processor 104 may be mapped to different values of repetition factor and their orders in the set, and are denoted as $T_{<M,m>}(\cdot)$ where the first value in the subscript tuple <M, m> is referred to as the repetition factor while the second value identifies the $m^{th}$ transform function from a total of M transform functions in the set; thus m=0, 1, 2, . . , M−1 is the index identifying a particular transform function of the M transform functions. The repetition factor thus represents the number of transform functions in a set. Transform processor 104 may use one or more sets of transform functions, but once the repetition factor may be determined for a control message, the transmitter can only use transform functions from the set corresponding to that repetition factor. For example, transform processor 104 can use three sets of transform functions denoted by $\{T_{<M,>}\}$, $\{T_{<K,>}\}$, and $\{T_{<L,>}\}$ where the first set has M transform functions, the second set has K transform functions and the third set has L transform functions where M, K, and L may be integers equal to 1 or greater. The respective transform functions may be thus $T_{<M,m>}(\cdot)$, $T_{<K,k>}(\cdot)$ and $T_{<L,l>}(\cdot)$. It should be noted that each transform function from each of the sets may be unique and may be not equal to any other transform function of the same or different set; thus for example $T_{<M,0>}(\cdot) \neq T_{<K,0>} \neq T_{<L,0>}$. Each transform function from each of the sets has an associated inverse transform function generally denoted as $T^{-1}_{<M,m>}(\cdot), T^{-1}_{<K,k>}(\cdot)$ and $T^{-1}_{<L,l>}(\cdot)$. Two transform functions may be associated with each other if they have the same repetition factor and the same index and one may be the inverse of the other. The coded block of information from channel coder 102 may be replicated a certain number of times depending on which set of transform functions may be applied to the coded block of information. For example if the transform function set $\{T_{<M,\cdot>}(\cdot)\}$ may be selected, then M replicas of the coded block of information may be generated either by channel coder 102 or by transform processor 104 and each of the M transform functions may be applied to one of M replicated coded block of information resulting in a control message having M transformed coded blocks of information at the output of transform processor 104. Each coded block of information may be a sequence of symbols, S, where the length of the sequence may be defined as N, i.e., $S = \{s_0, s_1, s_2, \ldots, s_{N-1}\}$ where N may be an integer equal to 2 or greater. The transform functions and their associated inverse transform functions meet the following criteria:

1. $T_{<M,m>}(\cdot) = T_{<K,k>}(\cdot)$ if and only if M=K and m=k
2. $T_{<M,m>}(\cdot)$ has a unique inverse transform $T^{-1}_{<M,m>}(\cdot)$, that satisfies $T^{-1}_{<M,m>}(T_{<M,m>}(S)) = S$ for all S.
3. If M≠K or m≠k, then for all eligible integers D that satisfy $1 \leq D < \min(M-m, K-k)$, it may be with very low probability that the channel decoder gets identical decoding results on both S and $$\sum_{d=0}^{D-1} T^{-1}_{<M,m+d>}(T_{<K,k+d>}(S))$$

for all S.

The first criterion states that two transform functions may be equal if and only if they may be from the same set and have the same index value. The second criterion states that the inverse of a transform function has the same repetition factor and the same index and that applying the inverse transform function to its associated function neutralizes both functions leaving the particular block of information (or variable or value) to which the transform function was applied. The third criterion states that if the receiver makes the wrong hypothesis on either the repetition factor or the elapsed history of the control message, the channel decoding performed on any soft-combination of received sub-frames can hardly recover the original transmitted information.

The actual transform function may be implemented with linear operations such as scrambling and/or interleaving. It will be understood that the transform can be implemented with the use of any well known linear operation or linear function. The interleaving operation may be a general operation in which the time order of a block of symbols may be altered in accordance with some particular pattern. In a general interleaving operation, each time the time order of the block of symbols may be altered, they follow a different pattern. The scrambling operation may be simply changing signs of various symbols of information in a sequence of information in accordance with a particular pattern. Various other well known linear operations or combinations thereof can be used to implement the transform and inverse transform functions. As long as they obey the three criteria mentioned above, they fall within the scope of this invention. The transform functions (inverse transform functions) can be implemented with an interleaver (deinterleaver) or with a scrambler (descrambler) or with a combination of both. Assuming that each of the coded blocks of information, S, prior to being transformed has a length of N symbols (e.g., N bits), the scrambling operation may be performed by multiplying one of the following matrices (or a combination thereof) to a coded block, S:

$$W_{<M,m>} = \begin{bmatrix} -1 & 0 & \cdots & 0 \\ . & . & \cdots & . \\ . & . & . & . \\ . & . & . & . \\ 0 & . & \cdots & 1 \end{bmatrix}$$

where $W_{<M,m>}$ is a diagonal matrix whose diagonal elements equal to 1 and/or –1. The pattern of diagonal elements can be mapped to the tuple <M,m>. Matrix W is an N×N matrix. The interleaving operation may be also implemented by multiplying a matrix P to a coded block S. This invention introduces a specific interleaving matrix—a simple circular shift matrix as follows:

$$P_{<M,m>} = \begin{bmatrix} 0 & I_{N-F} \\ I_F & 0 \end{bmatrix}$$

where $I_F$ is an F×F identity matrix and F is an integer function mapped to tuple <M,m>, for example, $$F = m + \sum (\text{all repetition factors less than } M).$$

Matrix $P_{<M,m>}$ is an N×N matrix; $W_{<M,m>}$ is an N×N matrix and S is a N×1 matrix. Examples of the transform functions used in the method and system of the present invention may be as follows:

$$T_{<M,m>}(\cdot) = P_{<M,m>} \text{ where } T_{<M,m>}(S) = P_{<M,m>} \cdot S \text{ and } T^{-1}_{<M,m>}(S) = P^{-1}_{<M,m>} \cdot S \quad (1)$$

$$T_{<M,m>}(\cdot) = W_{<M,m>} \text{ where } T_{<M,m>}(S) = W_{<M,m>} \cdot S \text{ and } T^{-1}_{<M,m>}(S) = W^{-1}_{<M,m>} \cdot S \quad (2)$$

$$T_{<M,m>}(\cdot) = P_{<M,m>} \cdot W_{<M,m>} \text{ where } T_{<M,m>}(S) = P_{<M,m>} \cdot W_{<M,m>} \cdot S \text{ and } T^{-1}_{<M,m>}(S) = W^{-1}_{<M,m>} \cdot P^{-1}_{<M,m>} \cdot S \quad (3)$$

$$T_{<M,m>}(\cdot) = W_{<M,m>} \cdot P_{<M,m>} \text{ where } T_{<M,m>}(S) = W_{<M,m>} \cdot P_{<M,m>} \cdot S \text{ and } T^{-1}_{<M,m>}(S) = P^{-1}_{<M,m>} \cdot W^{-1}_{<M,m>} \cdot S \quad (4)$$

The receive equipment of the system of the present invention comprises antenna 108 coupled to inverse transform processor 110 (i.e., a receiver processing unit) which may be coupled to channel decoder 112 which in turn may be coupled to CRC decoder 114. Antenna 108 receives information and allows such information to be processed by receiving radio equipment (not shown). The information may be then applied to inverse transform processor 110 comprising deinterleaver 110A coupled to descrambler 110B. The order of deinterleaver 110A and descrambler 110B can be re-arranged according to the corresponding order of their peers in the transmit end. Deinterleaver 110A performs an inverse interleaving operation on a received transformed sub-frame and provides such processed sub-frame to descrambler 110B for further processing. The processed transformed sub-frame may be then decoded by decoder 112 and CRC checked by CRC decoder 114. If the correct inverse transform was applied to the received transformed sub-frame, the received sub-frame will have passed the CRC check and the original raw information may be obtained. It should be noted that inverse transform processor 110 can be implemented with only interleaver 110A or with only descrambler 110B, if there may be only one peer operator in the transmit end. If the CRC check may be not passed, then the next sub-frame may be processed using a different group of inverse transform functions from each of the known sets of transform and inverse transform functions. The transmit equipment and receive equipment have corresponding transform and inverse transform functions and thus apply linear functions or linear operations—that may be the exact inverse of each other—to the control message or transformed control message respectively.

Figure 2:
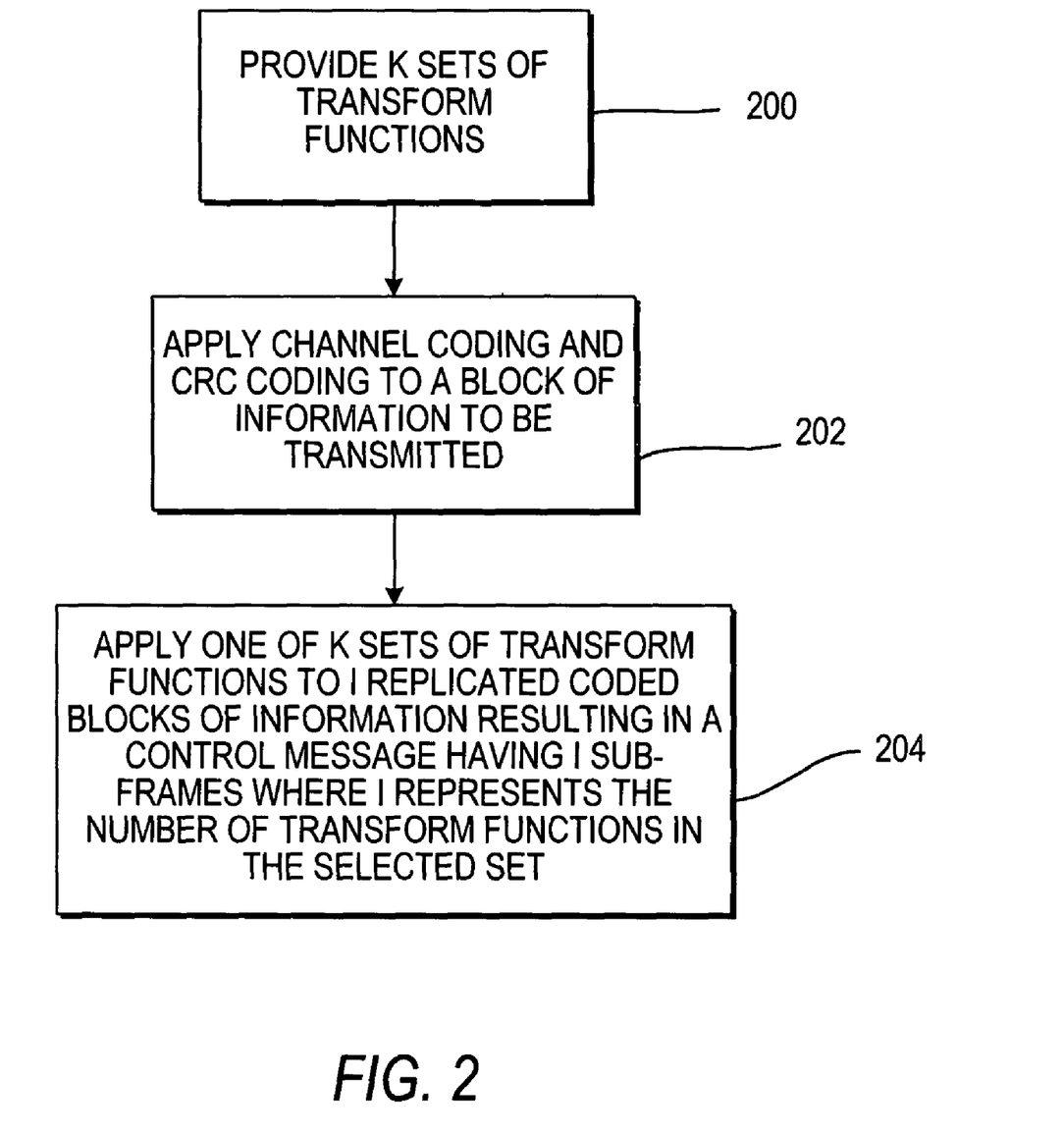
FIG. 2 is a flow chart of the method of the present invention as practiced at a transmit end.

Referring now to FIG. 2, there is shown the steps of the method of the present invention at a transmit end. In step 200, K sets of transform functions may be generated where K may be an integer equal to 1 or greater. Each set has a different number of transform functions. The transform functions meet the criteria described above and can be implemented using the linear operations and/or functions discussed supra. In step 202 a block of information to be transmitted may be coded using CRC coding and channel coding. Examples of channel coding are convolutional coding and block coding. In step 204 one of the K sets of transform functions may be selected. The set of transform functions can be selected based on one or more factors. A particular set may be selected based on the last known channel conditions. For example, if the last known channel conditions were relatively bad, one of the larger set of transform function would be selected because such a set provides more opportunities to decode the information once received. The particular set can be selected on round-robin basis to avoid using the same set in consecutive transmissions. The particular set can be selected based on how quickly the last transmitted message was decoded. If the transmitter may be able to determine that the last transmitted message was decoded during the first sub-frame, it may want to use the same set of transform functions in an attempt to have the same result in subsequent transmissions. The particular set of transform functions can be selected using a particular algorithm that take into consideration all of the above mentioned factors and any additional factors deemed important by system designers.

Once a set of transform functions may be selected, the coded block of information may be replicated I times where I may be an integer equal to 1 or greater and represents the number of transform functions in the selected set. The replicated coded blocks can thus be a control message in which each coded block may be a sub-frame, S, containing N symbols, i.e., $S=\{s_0, s_1, s_2, \ldots, s_{N-1}\}$. A different transform function may be applied to each sub-frame of the control message. The transform functions may be applied in consecutive order to the control message; that may be, the first transform function may be applied to the first sub-frame, the second transform function may be applied to the second sub-frame and so on. Thus, the selected set of transform functions will indicate the length of the transmissions (i.e., total number of sub-frames in received control message) and because each coded block may be transformed with its corresponding ordinal transform (i.e., first block with first transform, second block with second transform and so on) the transform functions can specify which particular sub-frame may be being processed thus allowing a receiver to determine how long the transmitter has been transmitting.

Figure 3:
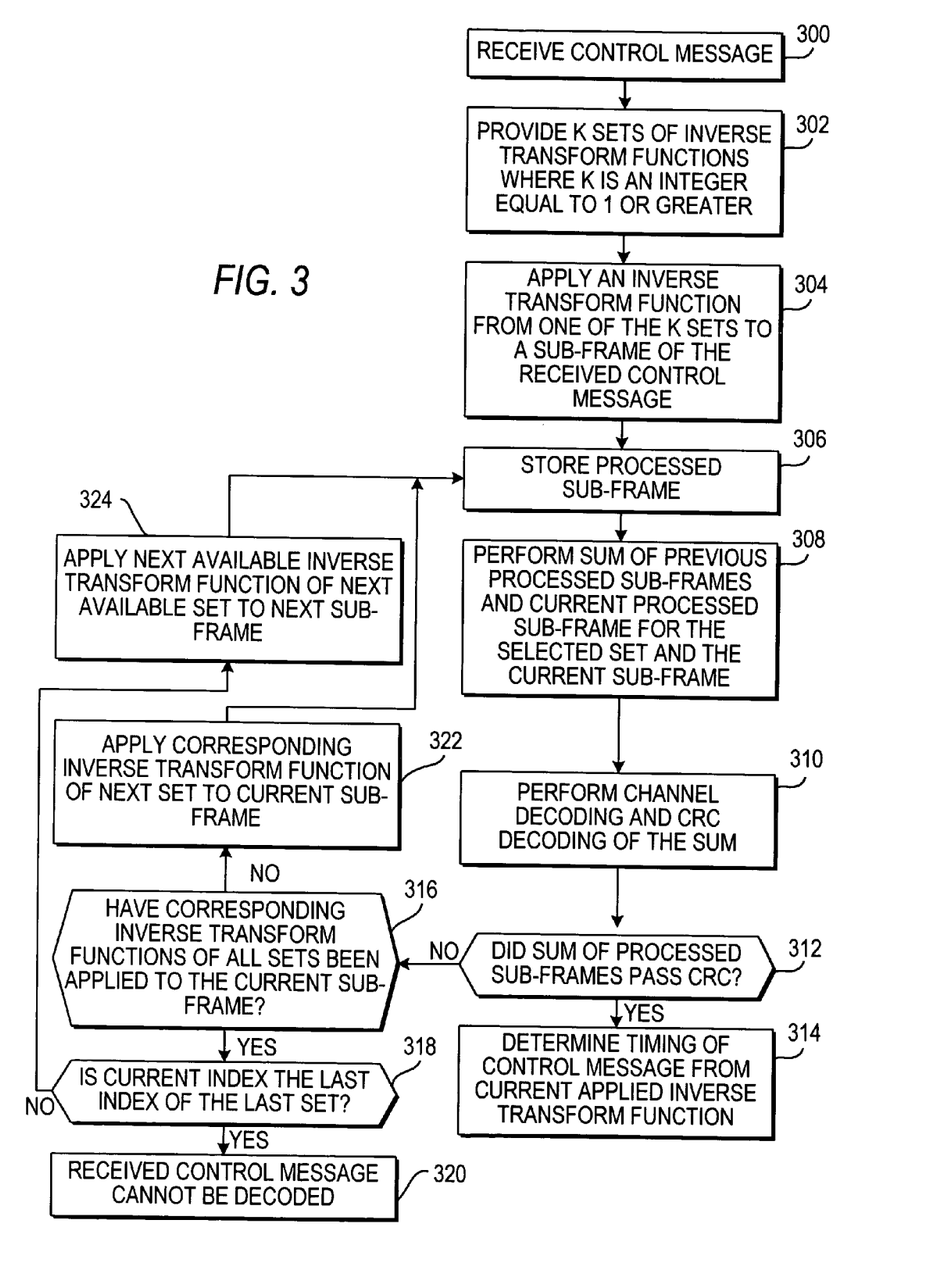
FIG. 3 is a flow chart of the method of the present invention as practiced at a receive end.

Referring now to FIG. 3, there is shown the steps of the method of the present invention at a receive end. For ease and clarity of discussion, the steps of the method of the present invention at a receive end will be described in the context of a wireless communication system in which there may be three sets of transform functions and three sets of associated inverse transform functions, i.e., K=3. The three sets have repetition factors or set sizes $M_1=2$, where index $m_1=0, 1$; $M_2=4$ where index $m_2=0, 1, 2, 3$, and $M_3=8$ where index $m_3=0, 1, 2, \ldots, 7$ respectively. Thus, the first set has two (2) functions, the second set has four (4) functions and the third set has eight (8) functions. In step 300 a control message transformed with functions from the second set (i.e., $\{T_{<4,\cdot>}\}$) may be received. In many wireless communication system, the receive equipment may be not able to detect the start of the control message, but the receive equipment may be provided with synchronization information allowing it to detect the end of each sub-frame as this may be system timing. The received sub-frame is typically stored in some type of buffer or temporary register for processing. Thus, when the boundary between the first sub-frame and the second sub-frame may be occurring, the receive equipment will detect this boundary and make the assumption that it had begun receiving the control message one sub-frame ago. In step 302, three (3) sets of inverse transform functions may be provided. The 3 sets of inverse transform functions can be provided prior to step 300 or during step 300; in other words the order of steps 300 and 302 need not occur as shown in the flow chart. The three (3) sets of inverse transform functions can be provided by offline processing equipment having access to the receiving equipment or they can be generated by the receive equipment.

In step 304 inverse transform function $T_{<2,0>}^{-1}$ from the first set may be applied to the stored received sub-frame resulting in a processed sub-frame. In step 306, the processed sub-frame may be stored in some temporary register or temporary buffer. In step 308 the current processed sub-frame may be summed with any previous processed sub-frame from the current set. In step 310 channel decoding and CRC decoding may be performed on the sum. In step 312, the method of the present invention verifies whether the sum passed the CRC. At this point, it will not pass the CRC because the applied inverse transform may be from the first set whereas the sub-frame was transformed with a function from the second set. The method of the present invention therefore moves to step 316 to see if the corresponding inverse transform functions of all the sets have been applied to the current sub-frame. Corresponding inverse transform functions may be inverse transform functions that may be from different sets but have the same index. Thus, $T_{<2,0>}^{-1}$, $T_{<4,0>}^{-1}$ and $T_{<8,0>}^{-1}$ may be corresponding inverse transform functions. Because only the inverse transform function from the first set has been applied, the method of the present invention moves to step 322.

In step 322 the transform $T_{<4,0>}^{-1}$ from the second set may be applied to the sub-frame resulting in a processed sub-frame that may be stored in step 306. Again, as with the processed sub-frame from the first set, the processed sub-frame may be summed with any previous processed sub-frames from the second set. At this point, there may be no other processed sub-frames from the second set since the current processed sub-frame may be the first sub-frame processed with an inverse transform function from the second set. A decoding operation and a CRC test may be performed in steps 310 and 312 respectively. At this point, the CRC can pass because the current processed sub-frame was transformed with a transform function from the second set. Suppose the CRC test passes, then the method of the present invention moves to step 314 where the timing of the control message may be determined. Specifically, the control message may be now known to contain four (4) sub-frames. Because the length of each sub-frame may be a system defined parameter, the length of the control message can thus be determined. For example if the length of a sub-frame may be 2.5 milliseconds, the length of the current control message may be determined to be 10 milliseconds. Further, the receiving equipment can determine how long the transmission has been occurring; this may be because the CRC passed after the first inverse transform was applied which means that the current sub-frame may be the first sub-frame of the control message. Therefore, the receiver can properly conclude that transmission has been occurring for approximately 2.5 milliseconds. Note that at this point the original information can be decoded without having to decode the entire control message; this may be an example of early decoding which provides the receiver an opportunity to obtain the original information without having to process the entire control message. It may be possible that after applying the first inverse transform function from the second set (i.e., $T_{<4,0>}^{-1}$) the CRC test fails because of the relatively poor quality of the channel over which the control message was transmitted. In such a case, the method of the present invention would again move to step 316.

At this point in step 316 only the first corresponding inverse transform functions from the first and second sets have been applied and therefore the method of the present invention moves to step 322 where the first inverse transform from the third set (i.e., $T_{<8,0>}^{-1}$) may be applied to the current sub-frame. Steps 306-312 may be performed on the sum of the processed sub-frame and any previous sums of processed sub-frames. In step 312 the CRC test will fail since an inverse transform function from the third set may be applied to a sub-frame transformed by a function from the second set. At this point the method of the present invention moves to step 316 once again but this time all of the inverse transform functions having index 0 (i.e., corresponding inverse transform functions) from all three sets have been tried. Therefore, the method of the present invention now moves to step 318. Since the method of the present invention has only tried inverse transform functions having indices 0, there may be more inverse transform functions that can be applied to sub-frames in order to properly decode one of the remaining sub-frames. At this point the method of the present invention moves to step 324. Note that when all of the inverse transforms of all of the sets of inverse transforms have been tried, the entire control message has been processed and none of the sub-frames has passed the CRC test. In such a case, that is, in step 320 the transmitted control message could not be decoded possibly because of the relatively poor quality of the communication channel over which the control message was transmitted.

In step 324, the receiver at this point cannot properly decode the first sub-frame because the first inverse transform function from each of the three sets has been tried. When the receiver detects the boundary between the first and second sub-frames, it will make the assumption that transmission of the control message started two sub-frames ago. The second sub-frame may be stored in a temporary register. The inverse transform functions having index of 1 from all different sets (i.e., the second function from each set) will now be applied to this second sub-frame. Starting with $T_{<2,1>}^{-1}$ from the first set, a processed sub-frame may be obtained. In step 306 the processed sub-frame may be stored. In step 308, the sum of processed sub-frames for the first set may be performed; this means that the processed sub-frames obtained from the application of the inverse transform $T_{<2,0>}^{-1}$ to the first sub-frame and application $T_{<2,1>}^{-1}$ to the second sub-frame may be summed. Decoding and CRC tests may be performed on the sum in step 310. The CRC test will fail in step 312 and we then move to step 316 which indicates that the second set and the third set of inverse transform functions having index of 1 have not yet been tried.

The method of the present invention now moves to step 322. In step 322 $T_{<4,1>}^{-1}$ from the second set may be now applied to the current sub-frame and, as per step 306, the resulting processed sub-frame may be stored. In step 308 the processed current sub-frame from the second set may be added to the previous processed sub-frame from the second set, i.e., the sub-frame to which $T_{<4,0>}^{-1}$ was applied. Therefore, at this point the sum $T_{<4,0>}^{-1}+T_{<4,1>}^{-1}$ may be performed and the result may be decoded in step 310 and may be determined to have passed the CRC test in step 312. The method of the present invention now moves to step 314 where it may be determined that the control message has been received for two sub-frames and the length of the control message may be four sub-frames.

In sum, the method of the present invention at a receive end applies an inverse transform function from each of its sets to a received sub-frame resulting in a processed sub-frame. At each point after an inverse transform function has been applied to the sub-frame from a particular set, the method of the present invention performs the sum of the current processed sub-frame with any previous processed sub-frame from that set. Previous processed sub-frames from the current set were processed with different inverse transform functions. Early decoding may be thus possible with the method of the present invention since any of the sub-frames if decoded properly will yield the original information that was transmitted. The sum may be decoded and if it passes a CRC test, timing information for the received control message can be derived based on the current set of inverse transform functions.

It should be noted that various versions of the present invention can be implemented by those skilled in the art to which this invention belongs and all such versions will fall within the scope of the present invention. It should also be noted that the method and system of the present invention may be not limited to the transmission and reception of control messages over a feedback or signaling channel of a wireless communication system. For example, the method and system of the present invention can be applied to traffic channels of a communication system (wireless or wireline) or to any system in which replicated blocks of information having a certain format are transmitted over communication media.

We claim:

1. A method of transmitting information, comprising:
    selecting a plurality of transform functions to apply to a selected information block, wherein the number of transform functions in the selected plurality is indicative of timing information and at least one of the transform functions is different than at least one other of the transform functions;
    replicating the selected information block a number of times equal to the number of transform functions in the selected plurality;
    transforming each of the replicated information blocks using a respective transform function of the selected plurality;

transmitting the transformed information blocks during time periods of equal length; and consecutively applying one of the transform functions to one of the information blocks in an order associated with the selected plurality of transform functions.

2. The method of claim 1, comprising selecting one set of transform functions from a plurality of sets where such selection is based on an algorithm.

3. The method of claim 1, wherein the timing information comprises a length a control message indicated by the selected coded information block and wherein the number of transform functions indicates the length of the control message.

4. The method of claim 1, wherein a successful application of an appropriate inverse transform function corresponding to one of the selected plurality of transform functions applied to any one of a corresponding one of the transformed information blocks facilitates early decoding of the corresponding one of the information blocks.

5. The method of claim 1, wherein each of the transform functions is unique.

6. The method of claim 1, wherein the transform functions each comprise at least one of a scrambling function or an interleaving function.

7. A method of transmitting information, comprising:

selecting a plurality of transform functions to apply to a selected information block, wherein the number of transform functions in the selected plurality is indicative of timing information;

replicating the selected information block a number of times equal to the number of transform functions in the selected plurality;

transforming each of the replicated information blocks using a respective transform function of the selected plurality;

transmitting the transformed information blocks during time periods of equal length; and generating K sets of transform functions each denoted as $T<M,m>(\cdot)$ indicating an mth transform function from a total of M transform functions in a set and where $m=0, \ldots, M-1$, where M is referred to as a repetition factor and M and K are integers equal to 1 or greater and the transform functions of the K sets meet the following criteria:

(a) each transform function of the K sets of transform functions is unique;

(b) each transform function of the K sets of transform functions has an associated inverse transform function such that when the inverse transform function is applied to its associated transform function, the two transform functions neutralize each other;

(c) applying an inverse transform function to a non-associated transfer function that is applied to a block of information will not yield the block of information.

8. The method of claim 7, wherein the transform functions each comprise at least one of a scrambling function or an interleaving function.

9. A method of receiving transmitted information, comprising receiving a plurality of replicated blocks of information;

applying at least one inverse transform function from at least one set of inverse transform functions to at least one of the received blocks of information wherein at least one of the transform functions is different than at least one other of the transform functions;

determining whether the at least one applied inverse transform function successfully decodes the at least one received block of information; and determining timing information of the received blocks of information based upon a number of inverse transform functions in the set of inverse transform functions containing the at least one applied inverse transform function that successfully decodes the at least one received block of information.

10. The method of claim 9, wherein successful decoding is possible for any of the received blocks of information only when a corresponding inverse transform function is applied to a received block.

11. The method of claim 9, wherein each set of inverse transform functions corresponds to a set of transform functions applied to the received blocks of information before the received blocks were transmitted and wherein the number of inverse transform functions in each set equals a number of transform functions in the corresponding set.

12. The method of claim 9, wherein applying the at least one inverse transform function results in at least one processed block and wherein a sum of processed blocks associated with the set of inverse transform functions containing the at least one inverse transverse function applied to successfully decode the at least one block and wherein a successful decoding of a sum of processed blocks allows the timing of the received information to be determined.

13. The method of claim 9, wherein each of the received blocks is a sub-frame of a control message having a plurality of sub-frames where a transform function from a set of transform functions has been applied to each sub-frame and where such control message is transmitted over a control channel of a wireless communication system and the timing of the control message is determined from the set of inverse transforms that allowed a successful decoding operation.

14. The method of claim 9, wherein each of the inverse transform functions is unique.

15. The method of claim 9, wherein the inverse transform functions each comprise an inverse of at least one of a scrambling function or an interleaving function.

16. A method of receiving transmitted information, comprising:

receiving a plurality of replicated blocks of information;

applying at least one inverse transform function from at least one set of inverse transform functions to at least one of the received blocks of information;

determining whether the at least one applied inverse transform function successfully decodes the at least one received block of information; and determining timing information of the received blocks of information based upon a number of inverse transform functions in the set of inverse transform functions containing the at least one applied inverse transform function that successfully decodes the at least one received block of information, wherein a last applied inverse transform function indicates which sub-frame of a control message indicated by the received blocks of information was received, thus facilitating early decoding.

17. A method of receiving transmitted information, comprising receiving a plurality of replicated blocks of information;

applying at least one inverse transform function from at least one set of inverse transform functions to at least one of the received blocks of information;

determining whether the at least one applied inverse transform function successfully decodes the at least one received block of information; and determining timing information of the received blocks of information based upon a number of inverse transform functions in the set of inverse transform functions containing the at least one applied inverse transform function that successfully decodes the at least one received block of information, wherein the timing information comprises a length of a control message indicated by the received blocks of information and the number of inverse transform functions in the set of inverse transform functions containing the at least one applied inverse transform function corresponds to the length.

18. A system for receiving transmitted information, comprising a receiver for receiving a plurality of replicated blocks of information; and an inverse transform processor configured to apply at least one inverse transform function from at least one set of inverse transform functions to at least one of the received blocks of information, wherein at least one of the transform functions is different than at least one other of the transform functions;

determine whether the at least one applied inverse transform function successfully decodes the at least one of the received blocks of information; and determine timing information of the received blocks of information based upon a number of inverse transform functions in the set of inverse transform functions containing the at least one applied inverse transform function that successfully decodes the at least one received block of information.

19. The system of claim 18, wherein each of the inverse transform functions is unique.

20. The system of claim 18, wherein the inverse transform functions each comprise an inverse of at least one of a scrambling function or an interleaving function.

21. A system for receiving transmitted information, comprising a receiver for receiving a plurality of replicated blocks of information; and an inverse transform processor configured to apply at least one inverse transform function from at least one set of inverse transform functions to at least one of the received blocks of information;

determine whether the at least one applied inverse transform function successfully decodes the at least one of the received blocks of information; and determine timing information of the received blocks of information based upon a number of inverse transform functions in the set of inverse transform functions containing the at least one applied inverse transform function that successfully decodes the at least one received block of information, wherein the processor determines the timing information from decoding less than all of the received plurality of blocks of information.

* * * * *